United States Patent [19]

Chambers et al.

[11] Patent Number: 5,384,359

[45] Date of Patent: * Jan. 24, 1995

[54] COMPATIBILIZED COMPOSITIONS OF POLYPHENYLENE ETHER, POLYESTER RESINS AND POLYCARBONATE-POLYESTER COPOLYMERS

[75] Inventors: Gregory R. Chambers, Delmar, N.Y.; Gary F. Smith, Evansville, Ind.; John B. Yates, III, Glenmont, N.Y.

[73] Assignee: General Electric Company, Pittsfield, Mass.

[*] Notice: The portion of the term of this patent subsequent to Apr. 10, 2007 has been disclaimed.

[21] Appl. No.: 433,533

[22] Filed: Nov. 8, 1989

[51] Int. Cl.$^6$ .............. C08L 67/02; C08L 69/00; C08L 71/12

[52] U.S. Cl. ..................... 525/64; 525/67; 525/68; 525/92; 525/394; 525/397; 525/905

[58] Field of Search .......... 525/68, 394, 67, 905, 525/64, 68.92, 397

[56] References Cited

U.S. PATENT DOCUMENTS

| | | |
|---|---|---|
| 3,218,372 | 11/1965 | Okamura et al. |
| 3,299,172 | 1/1967 | Schade et al. |
| 3,413,379 | 11/1968 | Schade et al. |
| 4,013,613 | 3/1977 | Abolins et al. |
| 4,123,410 | 10/1978 | Lee, Jr. |
| 4,206,154 | 6/1980 | Lee, Jr. et al. |
| 4,358,568 | 11/1982 | Fox et al. |
| 4,367,317 | 1/1983 | Fox et al. |
| 4,461,877 | 7/1984 | Fox et al. |
| 4,507,442 | 3/1985 | Fox et al. |
| 4,510,289 | 4/1985 | Fox et al. |
| 4,511,693 | 4/1985 | Fox et al. |
| 4,560,722 | 12/1985 | Tyrell |
| 4,672,086 | 6/1987 | Seiler et al. |
| 4,841,001 | 6/1989 | Hawkins ............ 525/397 |
| 4,916,185 | 4/1990 | Yates, III et al. ....... 525/394 |

FOREIGN PATENT DOCUMENTS 0338268 10/1989 European Pat. Off.
8700850 2/1987 WIPO.

*Primary Examiner*—James J. Seidleck
*Assistant Examiner*—Thomas Hamilton, III

[57] ABSTRACT

In accordance with the invention, there are provided thermoplastic compositions comprising an admixture of:

(a) polyphenylene ether resin;
(b) polyester resin; and
(c) a compatibilizer for (a) and (b) comprised of polycarbonate-polyester copolymer in an amount sufficient to compatiblize components (a) and (b).

In preferred embodiments, the polycarbonate-polyester copolymer is present in an amount of at least 2%, preferably at least about 5% and more preferably from about 5% to about 25% by weight based on 100% by weight of (a) and (b). In addition, preferably, the polycarbonate component of said polycarbonate-polyester copolymer is present in an amount of at least 1%, preferably at least about 3%, and more preferably from about 3% to about 20% by weight based on 100% by weight of (a) and (b).

28 Claims, No Drawings

COMPATIBILIZED COMPOSITIONS OF POLYPHENYLENE ETHER, POLYESTER RESINS AND POLYCARBONATE-POLYESTER COPOLYMERS

FIELD OF THE INVENTION

The present invention relates to polycarbonate-polyester copolymers that can be utilized as compatibilizers to form compatibilized blends of polyphenylene ether resins and polyester resins. In preferred embodiments of the copolymer, the polycarbonate component of the copolymer is comprised of bisphenol-A polycarbonate and the polyester component of the copolymer is comprised of poly(1,4-butylene terephthalate).

BACKGROUND OF THE INVENTION

Polycarbonate-polyester copolymers are known in the art.

For example, Fox et al., U.S. Pat. Nos. 4,367,317 and 4,507,442, disclose copolymers prepared by the interaction of a melt mix of a high molecular weight bisphenol-A polycarbonate polymer, or a low molecular weight bisphenol-A polycarbonate polymer, and a high molecular weight diprimary dialcohol polyester polymer. The preferred polyester resin is polyethylene terephthalate.

Fox et al., U.S. Pat. No. 4,358,568, disclose copolymers prepared by the interaction of a melt mix of a polyarylate such as bisphenol A-isophthalate-terephthalate polyarylate, or bisphenol A-isophthalate-terephthalatecarbonate polyarylate and a high molecular weight diprimary dialcohol polyester polymer.

Fox et al., U.S. Pat. No. 4,510,289, disclose blends of polycarbonate and thermoplastic condensation polymers such as a co-polyestercarbonate, or a polyarylate, which are compatible in mixtures having varying ratios of components and which have improved properties.

Fox et al., U.S. Pat. No. 4,511,693, disclose blends of polycarbonate and thermoplastic addition polymers. The addition polymers used in the invention are comprised of units derived from repeat groups including a heterogroup.

Fox et al., U.S. Pat. No. 4,461,877, disclose thermoplastic compositions containing polycarbonate and poly(ethylene terephthalate) resins which are admixed to provide the composition with a single glass transition point (Tg).

Tyrell, U.S. Pat. No. 4,560,722, discloses thermoplastic compositions comprising di- and poly-ester resins and polycarbonate resins stabilized with boric acid.

Okamura et al., U.S. Pat. No. 3,218,372, disclose molding compositions comprising polycarbonates and polyalkylene terephthalates, e.g., poly(bisphenol-A carbonate and poly(ethylene terephthalate) whereby the two polymers are melt-mixed under a nitrogen atmosphere. Although the compositions are used for molding, they are merely melted together under nitrogen, e.g., at 290° C., and they are not described to be copolymers, but merely a "uniform mixture".

Schade et al., U.S. Pat. Nos. 3,299,172 and 3,413,379, disclose processes for the preparation of linear thermoplastic mixed polyesters by reacting a diaryl arylate, a poly(alkylene arylate) and, optionally, a diaryl carbonate in the presence of a transesterification and polycondensation catalyst. The materials produced by these processes are described to be "mixed polyesters" and they are not copolymers containing poly(aryl carbonate) units, although isolated mono aryl carbonate linkages might be produced if a diaryl carbonate is included in the reaction mixture.

Mercier et al., U.K. Patent No. 1,569,296, disclose that mixing aromatic polyesters and aromatic polycarbonates in the molten state induces a reaction leading to fast degradation of the polymers, but if an acidic stabilizing additive is then added, a useful product can be obtained, but in which the polyester and the polycarbonate are only "partly copolymerized". The stabilizing additive serves to prevent further reaction and is, therefore, not a catalyst. All of the additives exemplified in U.K. '296 are acidic, such as a phosphorous compound or a carboxylic acid. Moreover, such compositions will have three glass transition temperatures, one each for the respective homopolymers, and one for the copolymer. In terms of ultimate physical properties and appearance, as well as environmental resistance, such compositions are deficient, especially in comparison with the compositions of the Fox et al. patent which have only a single glass transition temperature. Such compositions also tend to become yellow with time.

In co-pending commonly-owned application, Ser. No. 947,660 now U.S. Pat. No. 5,055,531 filed Dec. 30, 1986, there are disclosed copolymers prepared by the interaction of a melt mix of a high molecular weight polyester polymer, such as a poly(alkylene arylates) and a high molecular weight polycarbonate or polyester carbonate in the presence of a catalyst. The copolymers are characterized by having substantially no content of polyester homopolymer and a ratio of arylate linkages to dihydric phenol arylate linkages of not substantially less than 20:1.

It is also known that polyphenylene ether and polyester resins are normally incompatible with one another and can form effective blends only when compatibilized such as through the use of compatibilizers. Such compatibilizers include rubber-modified high-impact polystyrene and polycarbonate. Moreover, reinforcements and/or flame retardant additives can be added to those blends.

For example, Abolins et al., U.S. Pat. No. 4,013,613, disclose thermoplastic compositions which include admixtures of polyphenylene ether and polyester resins. Included within the thermoplastic compositions of the patentees are those wherein the admixtures of resins are in combination with a reinforcing amount of a reinforcing filler. In combination, the three-component thermoplastic compositions included within the invention are those which do not delaminate or separate when cooled, and those which do not manifest a failure to form structurally useful compositions because of reduced gross physical properties, chemical resistance, macroscopic appearance and the like.

Betts et al., EP-A 0133641, disclose flame retardant thermoplastic compositions of admixtures of a polyester resin and a flame retardant agent comprised of a combination of a polyphenylene ether resin, an organic phosphate and a stable brominated material.

Lee, U.S. Pat. No. 4,123,410, discloses a thermoplastic composition of an admixture comprised of polyphenylene ether, a plasticizer and an amount of a polyester sufficient to reduce the melt viscosity of said composition without substantially reducing the heat distortion temperature and ductility properties. The preferred amount of polyester is 2–5% by weight.

Also, Lee et al., U.S. Pat. No. 4,206,154, disclose self-extinguishing thermoplastic molding compositions comprising a polyphenylene ether resin, a styrene resin, a halogenated aromatic flame retardant, ferrocene and from 1–15% by weight of a fatty-acid terminated saturated polyester.

Also, in copending commonly-owned application, Ser. No. 891,457 filed Jul. 29, 1986, now abandoned there are disclosed highly compatible polymer blends having a high degree of impact resistance and solvent resistance. These blends comprise at least one polyphenylene ether or blend thereof with at least one one polystyrene, at least one poly(alkylene dicarboxylate), at least one elastomeric polyphenylene ether-compatible impact modifier, and at least one polymer containing a substantial proportion of aromatic polycarbonate units. Illustrative of the linear polyesters are the poly(alkylene dicarboxylates) and especially the poly(alkyleneterephthalates).

In copending, commonly owned application, Ser. No. 010,867 filed Feb. 4, 1987, now abandoned there are disclosed similar polymer blends which are highly compatible and have high solvent resistance and favorable tensile properties but which are particularly useful in applications where impact strength is not the primary consideration. Finally, Seiler et al., U.S. Pat. No. 4,672,086 disclose self-extinguishing thermoplastic polyester molding materials containing a linear aromatic polyester resin, a polyphenylene ether resin, a phosphate-containing compound and a filler. The compositions may optionally contain an aromatic polycarbonate.

SUMMARY OF THE INVENTION

In accordance with the invention, there are provided thermoplastic compositions comprising an admixture of:
(a) polyphenylene ether resin;
(b) polyester resin; and
(c) a compatibilizer for (a) and (b) comprised of polycarbonate-polyester copolymer in an amount sufficient to compatibilize components (a) and (b).

In preferred embodiments, the polycarbonate-polyester copolymer is present in an amount of at least 2%, preferably at least about 5% and more preferably from about 5% to about 25% by weight based on 100% by weight of (a) and (b) in addition, preferably, the polycarbonate component of said polycarbonate-polyester copolymer is present in an amount of at least 1%, preferably at least about 3%, and more preferably from about 3% to about 20% by weight based on 100% by weight of (a) and (b).

A full range of properties is obtainable through variations in the compositions.

In addition, the inclusion of other property-improving components in property-improving amounts can effect desirable further improvements in the compositions.

DETAILED DESCRIPTION OF THE INVENTION

The present invention relates to the discovery that polycarbonate/polyester copolymers can be utilized as effective compatibilizers to compatibilize resin blends of polyphenylene ether resins and polyester resins in order to form blends having improved properties, including blends exhibiting properties as high impact alloys.

(a) The polyphenylene ether resin component of the compatibilized polyphenylene ether resin/polyester resin alloy.

The polyphenylene ether resin component is preferably a homo- or copolymer having units of the formula:

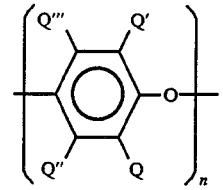

wherein Q, Q', Q" and Q'" are independently selected from the group consisting of hydrogen, halogen, hydrocarbon radicals, halohydrocarbon radicals, hydocarbonoxy radicals, and halohydrocarbonoxy radicals; and n represents the total number of monomer units and is an integer at least about 20, and preferably at least 50.

In general, the polyphenylene ether resins are self-condensation products of monohydric monocyclic phenols produced by reacting the phenols with oxygen in the presence of complex metal catalysts, with molecular weight being controlled by reaction time, longer times providing a higher average number of repeating units. Particular procedures are known to those skilled in the art and are described in the patent literature, including U.S. Pat. Nos. 3,306,874 and 3,306,875 (to Allan Hay), and U.S. Pat. Nos. 3,257,357 and 3,257,358 (to Gelu Stamatoff).

Illustrative polymers which can be produced by such procedures and which are within the above general formula are:
poly(2,6-dilauryl-1,4-phenylene)ether;
poly(2,6-diphenyl-1,4-phenylene)ether;
poly(2,6-dimethoxy-1,4-phenylene)ether;
poly(2,6-diethoxy-1,4-phenylene)ether;
poly(2-methoxy-6-ethoxy-1,4-phenylene)ether;
poly(2-ethyl-6-stearyloxy-1,4-phenylene)ether;
poly(2,6-dichloro-1,4-phenylene)ether;
poly(2-methyl-6-phenyl-1,4-phenylene)ether;
poly(2,6-dibenzyl-1,4-phenylene)ether;
poly(2-ethoxy-1,4-phenylene)ether;
poly(2-chloro-1,4-phenylene)ether;
poly(2,6-dibromo-1,4-phenylene)ether; and the like.

Examples of other polyphenylene ethers corresponding to the above formula can be found in the above reference patents of Hay and Stamatoff.

Also included are polyphenylene ether copolymers, such as copolymers of 2,6-dimethylphenol with other phenols, for example, with 2,3,6-trimethylphenol or 2-methyl-6butylphenol, and the like. One preferred copolymer is poly(2,6-dimethyl-co-2,3,6-trimethyl-1,4-phenylene) ether.

For purposes of the present invention, an especially preferred family of polyphenylene ethers includes those having alkyl substitution in the two positions ortho to the oxygen ether atom, i.e., those of the above formula wherein Q and Q' are alkyl, most preferably having from 1 to 4 carbon atoms. Illustrative members of this class are:
poly(2,6-dimethyl-1,4-phenylene)ether;
poly(2,6-diethyl-1,4-phenylene)ether;
poly(2-methyl-6-ethyl-1,4-phenylene)ether;
poly(2-methyl-6-propyl-1,4-phenylene)ether;

poly(2,6-dipropyl-1,4-phenylene)ether;
poly(2-ethyl-6-propyl-1,4-phenylene)ether; and the like.

The most preferred polyphenylene ether resin for purposes of the present invention is poly(2,6-dimethyl-1,4-phenylene)ether.

The polyphenylene ether resins useful in the compositions of this invention can be prepared by following known procedures, including those described by Allan Hay in U.S. Pat. Nos. 3,306,874 and 3,306,875 and by Gelu Stamatoff in U.S. Pat. Nos. 3,257,357 and 3,257,358.

(b) The polyester component of the polycarbonate/polyester copolymers and of the polyphenylene ether resin/polyester resin blends.

Polyesters suitable for use herein are derived from an aliphatic, aliphatic ether or cycloaliphatic diol, or mixtures thereof, preferably containing from about 2 to about 10 carbon atoms, and one or more aromatic or cycloaliphatic dicarboxylic acids. Preferred polyesters are derived from an aliphatic diol and an aromatic dicarboxylic acid having repeating units of the following general formula:

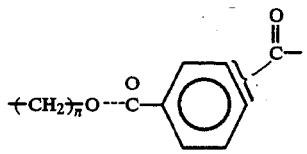

wherein n is an integer of from 2 to 10, preferably 2 to 4. The most preferred polyesters are poly(ethylene terephthalate) and poly(butylene terephthalate).

Also contemplated herein are the above polyesters with additional amounts of polyols and/or acids in the amounts of from 0.5 to 50 wt. percent based on the total composition. The acids can be aliphatic or cycloaliphatic with the number of carbon atoms ranging from 2 to 20. Likewise, the glycols can be cycloaliphatic or aliphatic with the number of carbon atoms covering the same range. Polyalkylene ether glycols can also be used where the alkylene portion has from 2 to 10 carbon atoms and the entire glycol portion varies in molecular weight from 100 to 10,000. All such polyesters can be made following the teachings of, for example, U.S. Pat. Nos. 2,465,319 and 3,047,539.

Also useful are the polyesters which are derived from a cycloaliphatic diol and an aromatic dicarboxylic acid. These are prepared, for example, by condensing either the cis-or trans-isomer (or mixtures thereof), for example, 1,4-cyclohexanedimethanol with an aromatic dicarboxylic acid so as to produce a polyester having recurring units of the following formula:

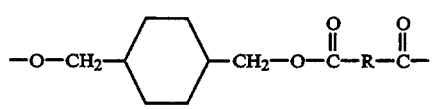

wherein the cyclohexane ring is selected from the cis- and trans-isomers thereof and R represents an aryl or cycloaliphatic radical containing 6 to 20 carbon atoms and which is the decarboxylated residue derived from an aromatic dicarboxylic acid.

Examples of aromatic dicarboxylic acids represented by the decarboxylated residue R are isophthalic or terephthalic acid, 1,2-di(p-carboxyphenyl)ethane, 4,4'-dicarboxydiphenyl ether, etc., and mixtures of these. Acids containing fused rings can also be present, such as in 1,4- or 1,5- naphthalenedicarboxylic acids. Also contemplated are cycloaliphatic diacids, such as cyclohexane dicarboxylic acid. The preferred dicarboxylic acids are terephthalic acid or a mixture of terephthalic and isophthalic acids.

Another preferred polyester may be derived from the reaction of either the cis- or trans-isomer (or a mixture thereof) of 1,4-cyclohexanedimethanol with a mixture of isophthalic and terephthalic acids. Such a polyester would have repeating units of the formula:

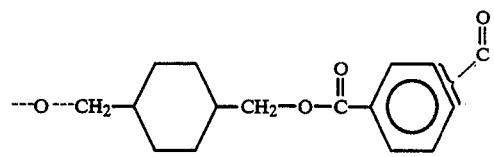

Still another preferred polyester is a copolyester derived from a cyclohexane dimethanol, an alkylene glycol and an aromatic dicarboxylic acid. These copolyesters are prepared by condensing either the cis- or trans-isomer (or mixtures thereof) of, for example, 1,4-cyclohexane-dimethanol and an alkylene glycol with an aromatic dicarboxylic acid so as to produce a copolyester having units of the following formula:

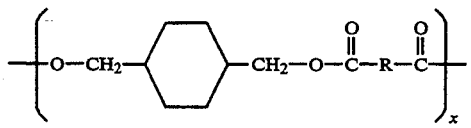

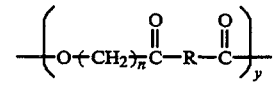

wherein the cyclohexane ring is selected from the cis- and trans-isomers thereof, R is as previously defined, n is an integer of 2 to 10, the x units comprise from about 1 to 99 percent by weight, and the y units comprise from about 99 to about 1 percent by weight.

Such a preferred copolyester may be derived from the reaction of either the cis- or trans-isomer (or mixtures thereof) of 1,4-cyclohexanedimethanol and ethylene glycol with terephthalic acid in a molar ratio of 80:20:100. These copolyesters have repeating units of the following formula:

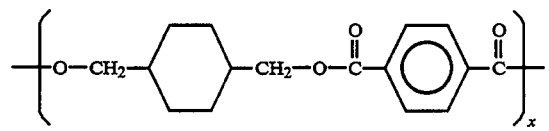

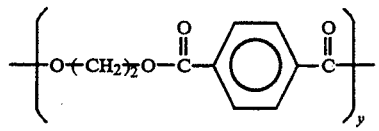

wherein x and y are as previously defined.

The polyesters described herein are either commercially available or they can be produced by methods known in the art, including those set forth in U.S. Pat. No. 2,801,466.

The polyesters employed in the practice of this invention will usually have an intrinsic viscosity of from about 0.4 to about 2.0 dl./g., as measured in a 60:40 phenol:tetrachloroethane mixture, or similar solvent at 23°-30° C.

A preferred polyethylene arylate which is employed in the invention is high molecular weight polyethylene terephthalate having an intrinsic viscosity (I.V.) of at least about 0.5 dl./g. or greater as measured in a solvent mixture of 60 parts by weight of phenol and 40 parts by weight of tetrachloroethane at 25° C. This particular solvent mixture is necessary for determining the intrinsic viscosity (I.V.) of polyethylene arylate, alone, or in incompatible blends with polycarbonates. Also preferred are poly(1,4-butylene terephthalate) and poly(1,4-cyclohexanedimethanol terephthalate) either also having an I.V. of at least about 0.5 dl./g.

(c) The polycarbonate component of the polycarbonate/polyester copolymer

Polycarbonate and polyester-carbonates are both useful as the polycarbonate component of the polycarbonate/polyester copolymer in this invention and are, preferably, wholly aromatic. These can be made by those skilled in the art or obtained from various commercial sources. They may be prepared by reacting dihydric phenol with a carbonate precursor, such as phosgene, a haloformate or a carbonate ester, or with such and an arylate precursor, e.g., an ester, free acid or acid halide of isophthalate and/or terephthalate acid. Typically, they will have structural units of the formula:

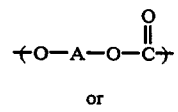

or

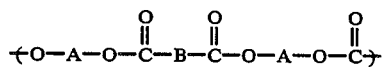

wherein A is a divalent aromatic radical of the dihydric phenol employed in the polymer producing reaction, and B is an divalent aromatic radical of the difunctional aromatic acid or derivative. Preferably, the aromatic carbonate or aromatic arylate/carbonate polymers have an intrinsic viscosity ranging from 0.30 to 1.0 dl./g. (measured in methylene chloride at 25° C.). By dihydric phenols is meant mononuclear or polynuclear aromatic compounds containing two hydroxy radicals, each of which is attached to a carbon atom of an aromatic nucleus. Typical dihydric phenols include 2,2-bis-(4-hydroxyphenyl)propane; 2,2-bis-(3,5-dimethyl-4-hydroxyphenyl)propane, 4,4'-dihydroxydiphenyl ether, bis(2-hydroxyphenyl)methane, mixtures thereof and the like. The preferred aromatic carbonate polymer is a homopolymer derived from 2,2-bis(4-hydroxyphenyl)-propane(bisphenol-A). The preferred aromatic arylate/carbonate polymers are derived from 2,2-bis(4-hydroxyphenyl) propane (bisphenol-A), a mixture of iso and terephthalate acids and phosgene or a phosgene precursor.

For a high molecular weight poly(bisphenol-A carbonate) or poly(bisphenol-A isoterephthalate carbonate), it is preferred to employ one having an intrinsic viscosity (I.V.) of at least about 0.45 dl./g. as measured in chloroform at 25° C.

(d) Impact Modifiers

Rubber modified impact modifiers can optionally be used along with the polycarbonate/polyester copolymer to effect or to improve compatibilization between the polyphenylene ether resin and the polyester resin. These rubber modified impact modifiers may be any of the elastomeric polymers and copolymers which are conventionally employed to improve impact properties in thermoplastics compositions. Illustratively, the impact modifiers can be selected from along elastomeric A-B-A[1] block copolymers wherein terminal blocks A and A[1] are the same or different and are in general derived from a vinyl aromatic compound, e.g., styrene, α-methyl styrene, vinyl toluene, vinyl xylene, vinyl naphthalene, and the like, and center block B is in general derived from a conjugated diene, e.g., butadiene, isoprene, 1,3-pentadiene, 2,3-dimethyl butadiene, and the like.

These can be made by an organometallic initiated polymerization process using for example, sodium or lithium metal or an organic derivative thereof. The diene monomers can be polymerized with a monofunctional or difunctional initiator, as is described in Kennedy et al., Interscience publishers, Vol. 23, Part II (1969), pages 553-559. Other methods of preparation are described in Zelinski, U.S. Pat. No. 3,251,905 and Holden et al., U.S. Pat. No. 3,231,635, the disclosures of which are incorporated herein by reference.

The relative ratios of the polymer units in the A-B-A[1] block copolymers can vary broadly. It is preferred that the center block B have a molecular weight greater than that of the combined terminal blocks. In general, the molecular weight of each of the respective terminal block will range from about 2,000 to about 100,000 and the molecular weight of the center block will range from about 65,000 to about 1,000,000.

Examples include the Kraton D resins, commercially available from Shell Chemical Co., Polymers Division, e.g., K-1101, K-1102 and K-1107.

Hydrogenated A-B-A[1] block copolymers can also be used and are also well known. In general, these are block copolymers of the A-B-A[1] type in which terminal blocks A and A[1] are the same or different and, prior to hydrogenation, comprise homopolymers or copolymers derived from vinyl aromatic hydrocarbons and, especially, vinyl aromatics wherein the aromatic moiety can be either monocyclic or polycyclic. Examples of the monomers are styrene, α-methyl styrene, vinyl xylene, ethyl vinyl xylene, vinyl naphthalene, and the like. Center block B will always be derived from a conjugated diene, e.g., butadiene, isoprene, 1,3-pentadiene, and the like. Preferably, center block B will be comprised of polybutadiene or polyisoprene.

The preparation of hydrogenated A-B-A[1] block copolymers is described in Jones, U.S. Pat. No. 3,431,323, the disclosure of which is incorporated herein by reference.

Examples include the Kraton G resins, commercially available from Shell Chemical Co., Polymers Division, e.g., G-1650, G-1651, and G-1652.

Also suitable are rubber-modified alkenyl aromatic resins, for example, rubber-modified high impact polystyrene. Examples of suitable alkenyl aromatic resins for compositions of the present invention are polystyrene, poly-p-methylstyrene, poly-α-methylstyrene, styrene-/α-methylstyrene, styrene/acrylonitrile, styrene/- methyl acrylate, styrene/butyl acrylate, styrene/methyl methacrylate, styrene/butadiene, styrene/maleic anhydride and styrene/acrylonitrile/butadiene copolymers, copolymers of ethylvinylbenzene and divinylbenzene, and styrene/butadiene polymers modified with acrylic resins. Mixtures of homopolystyrene and the above copolymers are also useful.

The rubber modifiers for the above alkenyl aromatic resins are elastomeric polymers. As a rule, such high impact styrene polymers contain from 2 to 20% by weight of an elastomeric polymer. Preferred elastomeric polymers have a glass transition temperature (Tg) of less than 0° C., in particular less than −20° C. Suitable elastomeric polymers are natural rubber, polybutadiene, polyisoprene, copolymers of butadiene and/or isoprene with styrene, a $C_2$–$C_8$-alkyl acrylate or acrylonitrile, polymers of $C_2$–$C_8$-alkyl acrylates, polyisobutylene and elastomeric copolymers composed of ethylene, propylene and dienes.

Also suitable for use as impact modifiers in the presently claimed compositions are the so-called core-shell copolymers. In general, such copolymers are comprised of a polymerized (cross-linked or non cross-linked) core having grafted thereon a dissimilar polymerized (cross-linked or non cross-linked) shell. The core-shell polymer morphology is well-known to those skilled in the art.

Among the useful core-shell copolymers are those having a cross-linked acrylate rubber core, such as butyl acrylate. Surrounding this cross-linked core is a shell-like structure of crosslinked styrenic resin, preferably styrene, which surrounds and interpenetrates the cross-linked core. Such core-shell polymers are described in detail in co-pending patent application Ser. No. 043,289 now abandoned filed Apr. 28, 1987.

Still other suitable core-shell copolymers suitable as impact modifiers are described in U.S. Pat. Nos. 3,944,631, 4,681,915, 4,684,696, 3,655,826, 3,793,402, 3,808,180, and 3,985,703.

For the blends of the present invention, the proportions of the various components are not critical and can be blended in all proportions of polycarbonate to polyester to form the copolymer and in all proportions of the copolymer to the polyphenylene ether resin and the polyester resin to form the compatibilized alloy. Other components such as flame retardants, stabilizers, and rubber modified impact modifiers can also be added in effective amounts.

The compositions of this invention can be formed into useful articles by any of the known methods for shaping engineering thermoplastics, special mention being made of extrusion and injection molding. They can also be formulated to contain additives, such as reinforcements, flame retardants, pigments, dyes, stabilizers, mold releases, impact improvers, and the like, in effective amounts. As reinforcements can be mentioned glass fibers, asbestos, Wollostanite, and the like, in amounts of from 1 to 40% by weight or more, preferably from 5 to 30%, and especially preferably, glass. Impact improvers generally comprise acrylate and arylate copolymers, either per se or in the form of core-shell grafts. Ethylene/ethyl acrylate, methyl methacrylate/butyl acrylate are typical impact improvers, generally in amounts between 2.5 and 25, more usually 5 to 10 parts per 100 parts by weight of copolymer in the composition.

Preferably, the polycarbonate-polyester copolymer is present from about 6% to about 19% by weight based on 100% by weight of the polyphenylene ether resin and polyester resin. Also preferably, the polycarbonate component of the polycarbonate-polyester copolymer is present from about 4% to about 17% by weight based on 100% by weight of the polyphenylene ether resin and polyester resin.

Rubber modified impact modifiers can be present in an amount from about 5% to about 50% by weight based on 100% by weight of the polyphenylene ether resin and polyester resin. Preferably, the impact modifiers are present in an amount less than about 25% by weight based on 100% by weight of the polyphenylene ether resin and polyester resin. Especially preferred is the situation where the impact modifiers are present in an amount about 20% by weight based on 100% by weight of the polyphenylene ether resin and polyester resin.

In the present invention, the polyphenylene ether resin can be present in a wide range of proportions, i.e., from 10–90% by weight and preferably 30–70% by weight based on 100% by weight of the polyphenylene ether resin (a) and polyester resin (b).

The polyester resin can also be present in a wide range of proportions, i.e., 10% to 90% by weight and preferably 30% to 80% by weight based on 100% by weight of the polyphenylene ether resin (a) and polyester resin (b).

The preparation of the compositions of this invention is normally achieved by merely blending the ingredients thereof under conditions adapted for the formation of an intimate blend. Such conditions often include extrusion, which may be conveniently effected in a screw-type or similar exruder which applies a substantial shearing force to the composition, thereby decreasing the particle size thereof. The extrusion temperature is generally in the range of about 100°–325° C.

In one embodiment of the invention, a single extruder is employed which has at least two ports for introduction of ingredients, one such port being downstream from the other. The polyphenylene ether, alone or in combination with an alkenyl aromatic, resin, is introduced through the first port and extruded, preferably at a temperature in the range of about 300°–350° C. This portion of the extruder is preferably vacuum vented.

The remaining ingredients are introduced through the downstream port and extrusion is continued, preferably at a lower temperature to minimize degradation. Typical extrusion temperatures at this stage are in the range of about 260° to 320° C.

The following examples illustrate the invention. They are set forth as a further description, but are not to be construed as limiting the invention thereto.

DESCRIPTION OF THE PREFERRED EMBODIMENTS

Copolymers of polycarbonate ("PC") and poly(1,4-butylene terephthalate) ("PBT"), in the ratios of 90% PC: 10% PBT or 70% PC: 30% PBT, are used to compatibilize blends of poly(2,6 dimethyl-1,4-phenylene) ether resin ("PPE") and PBT resin. (See Table 1). As seen in Table 1, several of the samples contain KRATON G-1651, which is a rubber modified polystyrene. Also, comparative samples A, B and C are provided in which no compatibilizer is used or in which PBT is not present with the PC.

The PPE and rubber-modified polystyrene were compounded in a Werner-Pfleiderer 30MM twin screw extruder after tumble mixing in a plastic bag. The screw RPM's were maintained at 320-350, and the melt temperature varied from about 550° to 600° F. A vacuum of approximately 20 in. Hg was applied to the melt. The remaining components, i.e. the PBT and PC-PBT copolymers, were added downstream from the vacuum, where the temperature ranged from about 520°-570° F.

The pelletized extrudes were dried at about 100° C. for 1-3 hours prior to injection molding into test specimens with a 4 oz. Newbury machine. The barrel temperature was maintained at 525° F. Mold temperature varied between 150°-170° F.

TABLE 1

PC/PBT Copolymers in PPE/PBT Alloys
(amounts are in parts by weight)

| Sample | PPO | PBT | PC | PC/PBT #1* | PC/PBT #2* | KRATON G-1651 |
|---|---|---|---|---|---|---|
| A | 30 | 46 | 0 | 0 | 0 | 0 |
| B | 30 | 46 | 8 | 0 | 0 | 0 |
| C | 30 | 46 | 8 | 0 | 0 | 16 |
| 1 | 30 | 45 | 0 | 0 | 10.6 (7.4) | 0 |
| 2 | 30 | 42 | 0 | 13.6 (12.2) | 0 | 0 |
| 3 | 30 | 46 | 0 | 5 (4.5) | 0 | 16 |
| 4 | 30 | 46 | 0 | 10 (9.0) | 0 | 16 |
| 5 | 30 | 46 | 0 | 0 | 5 (3.5) | 16 |
| 6 | 30 | 46 | 0 | 0 | 11 (7.7) | 16 |

PC = Lexan ML4735-111
PC/PBT #1 = 90% PC : 10% PBT copolymer
PC/PBT #2 = 70% PC : 30% PBT copolymer
*numbers in parenthesis represent amount of PC present Properties of the resulting PPE/PBT alloys containing the varying amount of PC or PC/PBT copolymers as compatibilizers are shown in Table 2.

The properties listed in Table 2 indicate that the PC/polyester copolymer is as effective as PC in compatibilizing PPE and PBT resins, in the presence or absence of an impact modifier, at various ratios of PC to polyester in the copolymer. The PC/polyester copolymer has compatibilized the PPE and PBT resins because the physical properties of the samples containing the copolymer (samples 1-6) are similar to the properties of the PC compatibilized PPE/PBT resins (samples B and C). Moreover, the physical properties of the compatibilized PPE/polyester alloys are significantly superior to the properties of the uncompatibilized PPE/polyester resins (comparative sample A), thus further establishing the efficacy of PC/polyester copolymers as a compatibilizer.

The compositions of the present invention can be molded per se or reinforced and impact-modified.

The above-mentioned patents, patent applications and/or publications are incorporated herein by reference.

The foregoing detailed description will suggest many variations to those skilled in this art. For example, instead of using poly(1,4-butylene terephthalate) as the polyester, other compounds such as poly(cyclohexanedimethanol terephthalate) can be substituted. Also, conventional additives such as flame retardants, clay, mica, pigments and colorants all can be added in conventional amounts for thermoplastic polymers for molding materials. All such variations are within the full intended scope of the appended claims.

We claim:

1. A thermoplastic composition comprising an admixture of:
   (a) polyphenylene ether resin;
   (b) polyester resin; and
   (c) compatibilizer for (a) and (b) consisting essentially of polycarbonate-polyester copolymer formed by copolymerizing a polycarbonate component and a polyester component in an amount sufficient to compatibilize components (a) and (b).

2. The composition according to claim 1 wherein (a) and (b) are present in major amounts and (c) is present in minor amounts.

3. The composition according to claim 1 wherein said polycarbonate-polyester copolymer is present from about 5% to about 25% by weight based on 100% by weight of (a) and (b).

4. The composition according to claim 1 wherein said polycarbonate component of said polycarbonate-polyester copolymer is present from about 3% to about 20% by weight based on 100% by weight of (a) and (b).

5. The composition according to claim 1 further comprising: (d) rubber modified impact modifier.

6. The composition according to claim 4 wherein said rubber modified impact modifier is present from about 5% to about 50% by weight based on 100% by weight of (a) and (b).

7. The composition according to claim 4 wherein said rubber modified impact modifier is present in an amount less than 25% by weight based on 100% by weight of (a) and (b).

TABLE 2

Properties of Various PPE/PBT Alloys Containing Different Amounts of PC or PC/PBT Copolymers as Compatibilizers

| | (A)* | (B)** | (1) | (2) | (C)** | (3) | (4) | (5) | (6) |
|---|---|---|---|---|---|---|---|---|---|
| Heat Distortion Temp. °F. at 66 psi | — | — | — | — | 308 | 298 | 305 | 301 | 286 |
| Notched Izod Impact ft-lb./in. | 0.2 | 0.3 | 0.2 | 0.4 | 16.7 | 7.6 | 15.6 | 1.7 | 8.7 |
| Dynatup Impact ft. /lb. | | | | | | | | | |
| RT | 1B | 16B | 3B | 12B | 45D | 46D | 52D | 36DB | 45D |
| −20° F. | — | — | — | — | 45B | 26B | 41B | 2B | 3B |
| Flexural Modulus (psi × 10³) | 369 | 370 | 375 | 372 | 241 | 238 | 238 | 249 | 252 |
| Flexural Srength (psi × 10³) | 7.4 | 13.8 | 14.0 | 13.8 | 9.4 | 9.3 | 9.4 | 9.3 | 9.5 |
| Tensile Yield (psi × 10³) | 4.0 | 8.5 | 7.9 | 8.3 | 6.6 | 6.4 | 6.8 | 5.4 | 6.2 |
| Tensile Strength (psi × 10³) | 4.0 | 8.5 | 7.9 | 8.3 | 5.4 | 5.4 | 5.6 | 5.7 | 5.1 |
| T-elg | 3 | 8 | 9 | 7 | 45 | 36 | 33 | 12 | 48 |

*Control D = Ductile DB = Ductile/Brittle B — Brittle **Comparison

8. The composition according to claim 4 wherein said rubber modified impact modifier is present in about 21% by weight based on 100% by weight of (a) and (b).

9. The composition according to claim 1 wherein the polyphenylene ether resin is present from 10% to 90% by weight based on 100% by weight of (a) and (b).

10. The composition according to claim 1 wherein said polyphenylene ether resin is present from about 30% to about 70% by weight based on 100% by weight of (a) and (b).

11. The composition according to claim 1 wherein (b) is present from 10% to 90% by weight based on 100% by weight of (a) and (b).

12. The composition according to claim 1 wherein (b) is present from 30% to 80% by weight based on 100% by weight of (a) and (b).

13. The composition according to claim 1 wherein said polycarbonate is bisphenol-A polycarbonate.

14. The composition according to claim 1 wherein said polyester component of said copolymer is poly(1,4-butylene terephthalate).

15. The composition according to claim 1 wherein component (b) is poly(1,4-butylene terephthalate).

16. The composition according to claim 1 wherein said polycarbonate-polyester copolymer is present in an amount of at least 2% by weight based on 100% by weight of (a) and (b).

17. The composition according to claim 1 wherein said polycarbonate-polyester copolymer is present in an amount of at least about 5% by weight based on 100% by weight of (a) and (b).

18. The composition according to claim 1 wherein said polycarbonate component of said polycarbonate-polyester copolymer is present in an amount of at least 1% by weight based on 100% by weight of (a) and (b).

19. The composition according to claim 1 wherein said polycarbonate component of said polycarbonate-polyester copolymer is present in an amount of at least about 3% by weight based on 100% by weight of (a) and (b).

20. The composition according to claim 3 wherein said polycarbonate-polyester copolymer is present from about 6 to about 19% by weight based on 100% by weight of (a) and (b).

21. The composition according to claim 4 wherein said polycarbonate component of said polycarbonate-polyester copolymer is present from about 4 to about 17% by weight based on 100% by weight of (a) and (b).

22. The composition according to claim 1 wherein component (a) is present in an amount of about 30 parts by weight, component (b) is present in an amount of about 42–45 parts by weight, and component (c) is present in an amount of from about 10.6 to about 13.6 parts by weight.

23. The composition according to claim 22 wherein the polycarbonate component of component (c) is present in an amount of from about 7.4 to about 12.2 parts by weight.

24. The composition according to claim 5 wherein component (a) is present in an amount of about 30 parts by weight, component (b) is present in an amount of about 46 parts by weight, component (c) is present in an amount of from about 5 to about 11 parts by weight, and component (d) is present in an amount of about 16 parts by weight.

25. The composition according to claim 24 wherein the polycarbonate component of component (c) is present in an amount of from about 3.5 to about 9 parts by weight.

26. A method of compatibilizing polyphenylene ether resin and polyester resin comprising:
  (a) copolymerizing a polycarbonate component and a polyester component to form a compatibilizer consisting essentially of a polycarbonate-polyester copolymer; and
  (b) admixing said compatibilizer consisting essentially of a polycarbonate-polyester copolymer with said polyphenylene ether resin and said polyester resin to form a compatibilized blend of polyphenylene ether resin/polyester resin.

27. A method according to claim 26 wherein said polyester component of said copolymer is poly(1,4-butylene terephthalate).

28. A method according to claim 26 wherein said polycarbonate is bisphenol-A polycarbonate.

* * * * *